United States Patent
Temmann

[19]

[11] Patent Number: 5,862,696
[45] Date of Patent: *Jan. 26, 1999

[54] METHOD AND APPARATUS FOR THE MANUFACTURE OF A POLY-V-PULLEY

[75] Inventor: Robert Temmann, Ascheberg, Germany

[73] Assignee: Leico GmbH & Co. Werkzeugmaschinenbau, Ahlen, Germany

[*] Notice: This patent issued on a continued prosecution application filed under 37 CFR 1.53(d), and is subject to the twenty year patent term provisions of 35 U.S.C. 154(a)(2).

[21] Appl. No.: 841,390

[22] Filed: Apr. 30, 1997

[30] Foreign Application Priority Data

May 20, 1996 [DE] Germany .......................... 196 20 178.0

[51] Int. Cl.⁶ ...................................................... B21H 5/00
[52] U.S. Cl. ......................... 72/110; 29/892.3; 29/893.32
[58] Field of Search ............................... 72/68, 110, 111; 29/892, 892.3, 893.32

[56] References Cited

U.S. PATENT DOCUMENTS

| | | | |
|---|---|---|---|
| 4,551,122 | 11/1985 | Kraft et al. | 72/83 |
| 5,072,509 | 12/1991 | Bichel et al. | 72/111 |
| 5,152,061 | 10/1992 | Himmeroeder | 29/893.32 |

FOREIGN PATENT DOCUMENTS

| | | | |
|---|---|---|---|
| 552776 | 7/1993 | European Pat. Off. | 29/892.3 |
| 3445942 | 7/1986 | Germany | 29/892.3 |
| 97324 | 4/1988 | Japan | 29/892.3 |

*Primary Examiner*—Lowell A. Larson
*Attorney, Agent, or Firm*—Oblon, Spivak, McClelland, Maier & Neustadt, P.C.

[57] ABSTRACT

The invention relates to a method and an apparatus for the manufacture of a poly-V-pulley, particularly with a toothed reference mark sensor. The method uses per se known spin forming and combines in one setting on a spinning machine with tool changers, the method steps of upsetting, profiling and gear cutting. The method according to the invention is preferably based on a tilted circular metal blank, which has a bevelled or angled marginal area with a clearly defined length and wall thickness. From the tilted or upset blank is formed a cup-shaped preform with an asymmetrically reinforced, cylindrical area with the aid of a spinning roll and subsequently in a radial setting is infed a spinning roll with a recess and an axially limited diameter reduction and material accumulation are obtained. This is followed by preprofiling, profiling of the thickened area and a gear cutting on a simultaneously constructed reference mark sensor of an outer flange.

13 Claims, 3 Drawing Sheets

METHOD AND APPARATUS FOR THE MANUFACTURE OF A POLY-V-PULLEY

FIELD OF THE INVENTION

The invention relates to a method for the manufacture of a poly-V-pulley with an integrated toothing with the purpose of a reference mark sensor, as well as to an apparatus for the manufacture of a poly-V-pulley with an integrated, toothing reference mark sensor with a spinning machine, which has chuck halves and successive, radially infeedable spinning and upsetting rolls, which is particularly suitable for performing the method.

BACKGROUND OF THE INVENTION

A method of the aforementioned type is described in DE 30 42 312 C2. From a metal sheet is punched a circular blank and a cup-shaped preform is produced, e.g. by deep-drawing or spinning. The cup-shaped preform with a radial hub area and a cylindrical area virtually perpendicular thereto and coaxial to a longitudinal axis has a uniform wall thickness. The preform is fixed in a spinning device and the cylindrical area is exposed to an axial pressure, while supported on a centrally mounted block, in order to bring about a "partial collapse" i.e. a radial outward bulging from the inside to the outside. A sought material accumulation for forming a grooved bed is consequently possible through a shortening of the cylindrical area. The circular blank or the cylindrical area of the cup-shaped preform must therefore be constructed with a corresponding length.

The radial bulging out is to be obtained by rolling of a pair of rollers, which are movable axially to one another and when in engagement define an approximately arcuate recess. In the case of an axial compression, the material of the cylindrical area collapses into said recess. With the aid of correspondingly constructed support areas before or during the axial compression and collapse, an inner flange is formed between the hub area and cylindrical area, as well as an outer flange on the free end of the cylindrical area and are directed radially outwards.

The collapsed, cylindrical area is then flattened, leading to a material thickening. With the aid of a profile roller and a central support block, as well as limiting chuck and spinning mandrel halves, a V-shaped profiling of the thickened area is carried out.

This method is particularly complicated from the machinery standpoint and leads to corresponding manufacturing costs.

In a method described in EP 0 343 314 B1, a bordering roll is radially infed directly onto a circular metal blank without forming a cup-shaped preform. The bordering or curling roll has a semicircular recess and brings about a corresponding rolling in of the blank edge. Subsequently, using a spinning roll, from the bordering is formed a cylindrical wall area with a wall thickness greater than that of the hub area. In this method an inner flange and an outer flange can only be constructed after flattening. The production of poly-V-pulleys with a toothed reference mark sensor on an outer flange is not possible.

The journal "Machinery and production engineering" of 26 Jan., 1977 discloses a method for the manufacture of a toothing on the end face of a rotationally symmetrical body. A circular blank is fixed in a spinning device and is frontally upset with radially infeedable spinning rolls. The spinning rolls are provided with a depression, which has an arcuate base surface between parallel walls. The material of the end region of the circular blank is forced into the depressions of the spinning rolls. The material displacement leads to a terminal thickening, which can be symmetrical, i.e. projecting uniformly to either side of the blank, or asymmetrical, i.e. projecting only to one side. A toothing is then performed on the thickened area.

SUMMARY OF THE INVENTION

The object of the invention is to provide an efficient method for the manufacture of a poly-V-pulley with a toothing as a reference mark sensor, which is performable in a spinning device with tool changers and in one setting, while providing an apparatus suitable for performing the method.

With respect to the method, according to the invention this object is achieved in that by radial spinning a cup-shaped preform is formed, which has a cylindrical area with at least one asymmetrical thickening, The cylindrical area subsequently undergoes a diameter reduction accompanied by a simultaneous formation of an outer flange and following a profiling of the cylindrical area a toothing is performed for the reference mark sensor formed on the outer flange. With respect to the apparatus, the object is achieved in that the radially infeedable spinning and upsetting rolls are asymmetrically constructed and have a projection and depression or a concave recess.

The invention is based on the idea of forming an asymmetrically thickened, cylindrical area. According to the invention, this is achieved by exclusively radially acting spinning or upsetting rolls, which have asymmetrically arranged and/or cylindrical or concave recesses and act on a circular metal blank and/or a metal pot or cup or a cup-shaped preform.

An essential idea is to obtain a material accumulation and formation of a thickened grooved bed with an optimum wall thickness by reducing the diameter of the cylindrical area. The asymmetrical thickenings and diameter reduction are combined in a particularly advantageous manner for the forming of an integrated reference mark sensor with an internal and/or external toothing.

The inventive method for the manufacture of a poly-V-pulley, particularly with a toothed reference mark sensor on a hub-remote, free end of an outer flange is performable in one setting of an inventively constructed and designed spinning machine and has the following method steps.

a) Manufacture of a tilted circular blank, which is understood to mean a blank with a bevelled or angled marginal area. Such a tilted circular blank can be prefabricated by pressing and then undergoes the further forming processes in a spinning machine. However, a tilted circular blank can also be manufactured in a spinning machine with the aid of a radially infed spinning roll and corresponding chuck jaw halves. The marginal area of the tilted circular blank has a clearly defined wall thickness So, as well as a defined length and the tilted blank consequently has a defined diameter Do.

Alternatively to a tilted circular metal blank, an upset circular metal blank can be used as a basis.

This can e.g. be manufactured in one setting with an upsetting or spinning roll, which for the forming of an upset, thickened blank edge with a thickened end region has an asymmetrical recess and a projection in the vicinity of a radial hub region of the circular metal blank. The term "asymmetrical recess" is understood to mean in this context all depressions in spinning rolls, which do not lead to a curling or bordering, i.e. to a rolling in or drawing in and not to the enclosing of the blank edge with two almost parallel marginal regions.

The asymmetrical recess comprises an unsymmetrical arrangement, e.g. an eccentric arrangement of the spinning roll and/or an unsymmetrical construction of the depression. For example, an asymmetrically constructed recess can have a type of baffle plate, which limits the material displacement and leads to a material accumulation and to a thickening on the baffle plate. In addition, by a type of backup the further depression of the spinning roll is filled with material.

b) Manufacture of a cup from the tilted circular metal blank, which has a diameter Do and a wall thickness So in the tilted marginal area, with a spinning roll having a projection on the radial hub region, a cylindrical area being formed substantially perpendicular to the radial hub region and with at least one asymmetrical thickening, particularly a thickening above the radial hub region and/or a thickening on the free end of the cylindrical area.

Alternatively the cup can be manufactured from an upset, marginally and terminally thickened circular metal blank with the aforementioned spinning roll.

c) Forming and diameter reduction of the metal cup with the aid of a radially infed, asymmetrically constructed spinning roll. The spinning roll has a cylindrical area and a depression on an outer edge, the latter being remote from the hub region of the preshaped metal cup.

Alternatively it is possible to use a spinning roll with an outer edge-side depression, but with a concave recess in place of a cylindrical recess. Together with a correspondingly constructed chuck or chuck halves, by a diameter reduction of the metal cup from D1 to D2, there is achieved a thickening and increase in the wall thickness from S1 to S2, the thickening being axially limited and simultaneously with the depression on the outer edge an outer flange is formed. In a similar manner to a bevel to be constructed on the radial hub region, the outer flange slopes outwards and can be additionally provided with a thickening of the alternately used, upset circular metal blank according to method step a).

In a further development of the method an asymmetrical arrangement of the concave recess can comprise the construction of the concave recess adjacent to a hub-side or inner flange-side projection of the spinning roll, which has roughly the same length as the outer flange-side projection. The outer flange-side projection cooperates with the depression of the spinning roll directed towards the spinning roll edge and with a chuck jaw half and leads to the forming of the outer flange. The outer flange is roughly twice as long as the inner flange, which is preferably preshaped during the subsequent preprofiling. The asymmetrical construction of the spinning roll includes an outer contour similar to a stylized "2", which can be placed round by 90° to the left. The concave recess can be regularly constructed or distorted towards the inner flange-side projection or outer flange-side projection.

d) Flattening the thickened, optionally asymmetrically constructed cylindrical area against the chuck halves of the setting with simultaneous preprofiling of the cylindrical area and preshaping of the inner flange with the aid of a radially acting preprofiling roll.

e) Final profiling of the preprofiled area and final forming or shaping of the inner flange.

f) Flattening the thickened, free outer flange, accompanied by the simultaneous forming of a reference mark sensor toothing with the aid of a spinning roll and a correspondingly constructed spinning mandrel.

The method according to the invention also covers a V-belt pulley with V-shaped grooves or also a tooth system, which has a hub region, which is virtually parallel to the cylindrical area. Such a poly-V-pulley with an integrated reference mark sensor tooth system is e.g. used for the construction of a vibration damper.

The advantages of the method and apparatus according to the invention are a single setting and the application of specifically constructed chuck halves. For the construction of material accumulations and thickenings, they cooperate with exclusively radially infeedable spinning or upsetting rolls. The integrated reference mark sensor toothing on an outer flange is particularly advantageous and leads to a reduction in the production costs.

BRIEF DESCRIPTION OF THE DRAWINGS

The method and apparatus are explained in greater detail hereinafter relative to embodiments and the attached, diagrammatic drawings, wherein.

DESCRIPTION OF THE PREFERRED EMBODIMENTS

FIGS. 1 to 6 show as a preferred application of the method according to the invention, the manufacture of a pulley 2, which has a poly-V-profiling 3 for receiving a V-belt with V-shaped grooves, as well as an integrated reference mark sensor 4 with toothing.

Production takes place in a spinning device or machine in one setting and with tool changers by successively infeedable spinning or upsetting rolls, profiling rolls and toothing rolls.

Figure 1:
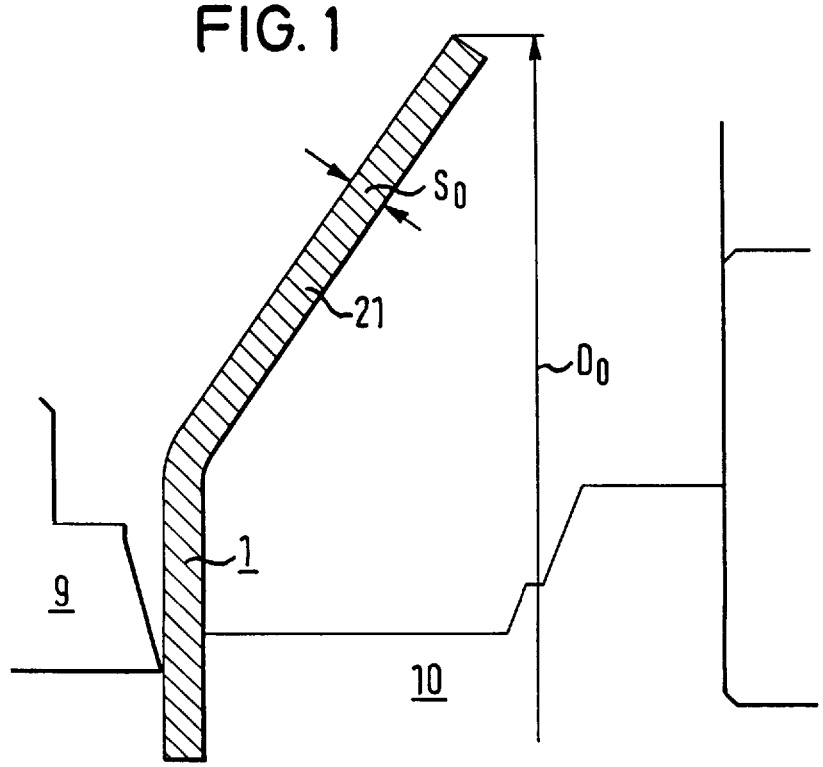
FIG. 1 shows a tilted circular metal blank fixed in a spinning machine.

In a preferred production mode the initial stage is constituted by a tilted circular metal blank 1, which has a bevelled or angled marginal area 21 with a clearly defined length and wall thickness So. The tilted circular metal blank 1 with a diameter Do can be produced by pressing or also in a spinning machine. FIG. 1 shows the tilted blank 1 fixed between chuck halves 9, 10.

Alternatively it is also possible to start with a circular metal blank having a predetermined diameter, which is upset in a defined manner with the aid of a spinning and upsetting roll and is provided with an upset, thickened blank edge, as well as a thickened terminal area due to a material shift and/or displacement. The clearly defined construction of an upset circular metal blank e.g. takes place with a spinning or upsetting roll, which has an asymmetrically constructed recess, as well as a projection cooperating with a chuck half. The thickened terminal area of the upset blank edge is provided for the construction of a reference mark sensor 4 (FIG. 6) with internal and/or external teeth. The upset blank edge and the thickened terminal area are formed by a defined upsetting and material displacement with the aid of the spinning or upsetting roll. As the asymmetrically constructed recess thereof has a virtually vertical baffle plate, which bounds a roughly outwardly sloping spinning wall, a material displacement and shift is limited. The resulting material accumulation in the recess leads to the upset, thickened blank edge with thickened terminal area.

Figure 2:
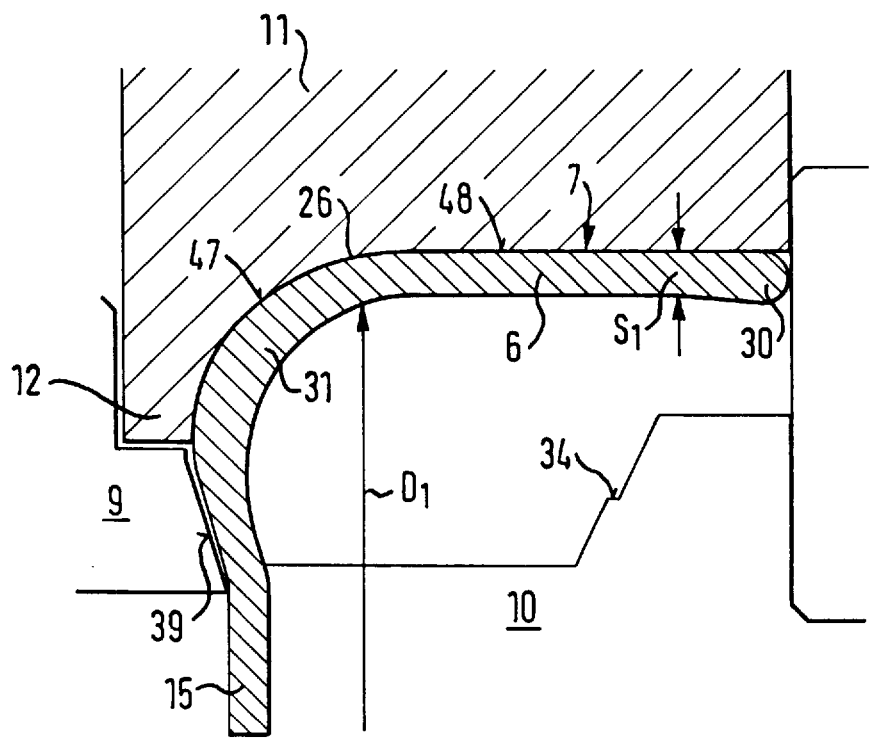
FIG. 2 A metal cup with a thickened, cylindrical area and a radially infed spinning roll with support or projection.

FIG. 2 shows a metal pot or cup 7 formed with the aid of a spinning roll 11 from the tilted circular metal blank 1 according to FIG. 1. The spinning roll 11 is provided with a projection 12, which cooperates with the chuck half 9, and with an asymmetrically positioned and constructed depression 47, as well as a largely horizontal area 48 and ensures the construction of a thickening 31 above the radial hub region 15 and a cylindrical area 6 with a wall thickness S1. FIG. 2 shows that a thicker terminal area 30 is formed, if the spinning roll 11 and chuck jaw half 10 externally bound the cup shaping.

Figure 4:
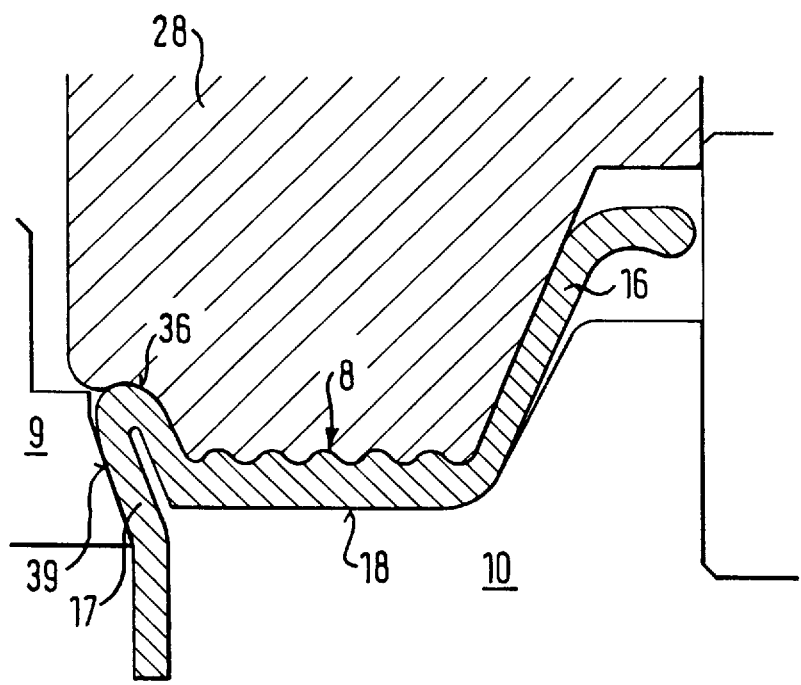
FIG. 4 A metal cup with a preprofiling and a preshaped inner flange and outer flange, as well as a preprofiling roll.

The thickening 31 is brought about by a material displacement into a roughly arcuate recess of the spinning roll 11 and in particular into a recessed area 47 bet ween the projection 12 and horizontal area 48. A bevelled area 39 of the chuck half 9 simultaneously leads to a bevel of the radial hub region 15, which is utilized for the construction of an inner flange 17 (FIG. 4).

Figure 3:
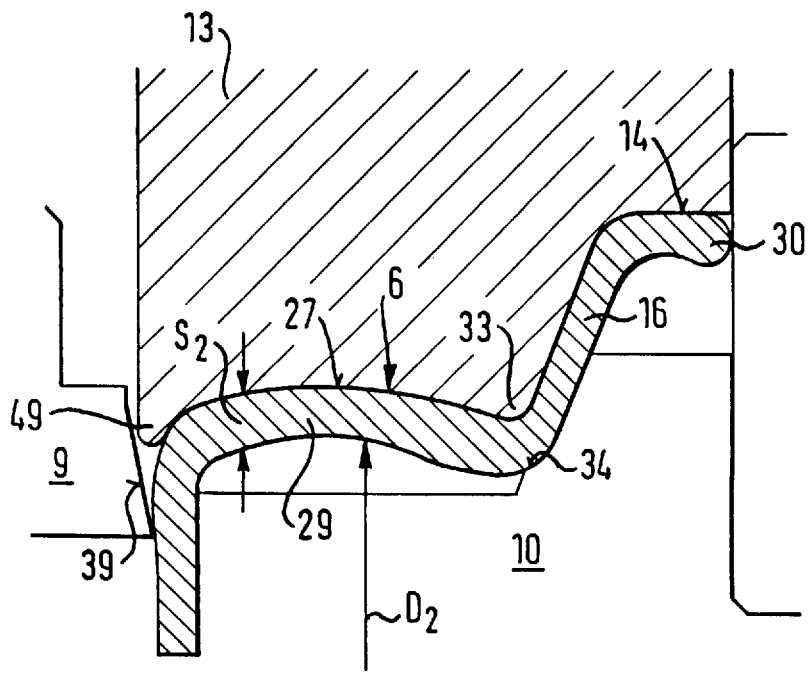
FIG. 3 shows a metal cup after a diameter reduction with forming of a thickening and an outer flange with thickening on the cylindrical area and radially infed spinning roll.

FIG. 3 shows a further material accumulation and thickening of the cylindrical area 6 with the aid of an asymmetrical spinning roll 13. The spinning roll 13 is preferably cylindrically constructed in an axially bounded region. In the present embodiment the spinning roll 13 is slightly concave and has an eccentric projection 33. This projection 33 cooperates with a step 34 of the chuck half 10 and leads to a material accumulation 29 in the concave recess 27 of the spinning roll 13 due to a diameter reduction to a diameter D2 of the cylindrical area 6 and to the formation of an outer flange 16 with the thickened terminal area 30. The outer flange-side projection 33 and a hub-side or inner flange-side projection 49 bound the concave or cylindrical recess 27 of the spinning roll 13. Since the recess 27 and also a depression 14 of the spinning roll, which brings about the construction of the outer flange 16, are constructed unsymmetrically, an unsymmetrical thickening and material accumulation in an axially bounded region are possible. The asymmetrical material thickening can be based on an asymmetric, concave recess 27, which e.g. has a greater camber towards the inner flange-side projection 49 than close to the outer flange-side projection 33.

Whereas the asymmetrically thickened metal cup 7 of FIG. 2 has a wall thickness S1, the wall thickness of the diameter-reduced, cylindrical area 6 according to FIG. 3 has increased to S2.

Together with a material movement into the cylindrical or concave recess 27 of the spinning roll 13, the formation of the outer flange 16 takes place, which is provided with the thickened terminal area 30. A radially outwardly directed inclination of the outer flange 16 is made possible by the correspondingly constructed chuck half 10 and homologously corresponds to the inclined position of the inner flange 17 (cf. FIG. 4).

FIG. 4 shows a preprofiling 8 of the asymmetrically thickened, cylindrical area 6 according to FIG. 3. The preprofiling 8 is carried out with a profile roll 28, which radially compresses according to FIG. 3 the largely concave material thickening 29 of the cylindrical area 6 and in conjunction with the chuck half 10 forms a smooth inner jacket 18. Simultaneously the inner flange 17 is formed by a cooperation of the chuck jaw half 9 with area 39 and an inner edge-side depression 36 of the profile roll 28.

Figure 5:
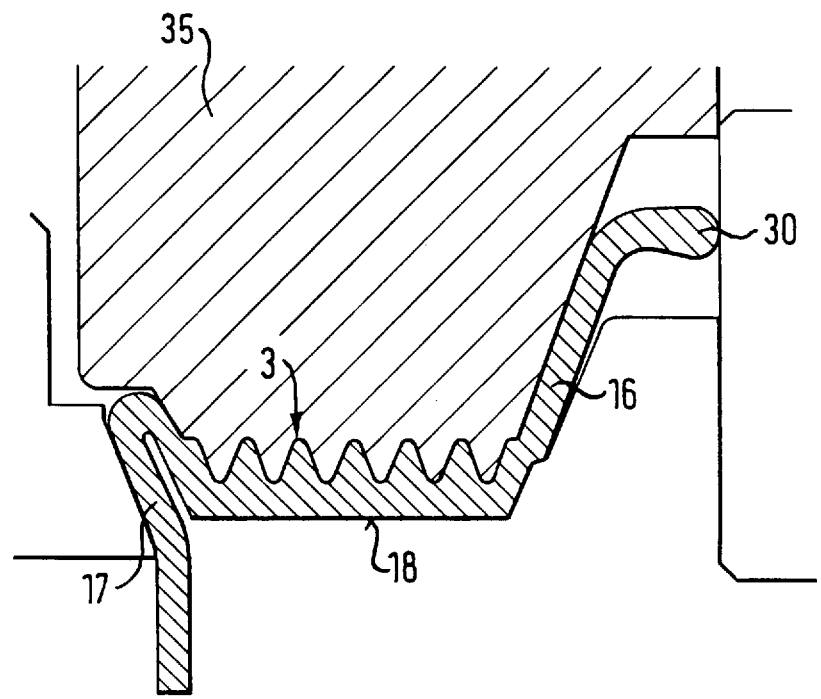
FIG. 5 shows a poly-V-profiling and finally shaped inner flange, as well as outer flange with thickening.

According to FIG. 5 the final profiling 3 takes place with a second profile roll 35, which is also radially infed and marginally corresponds to the preprofiling roll 28.

Figure 6:
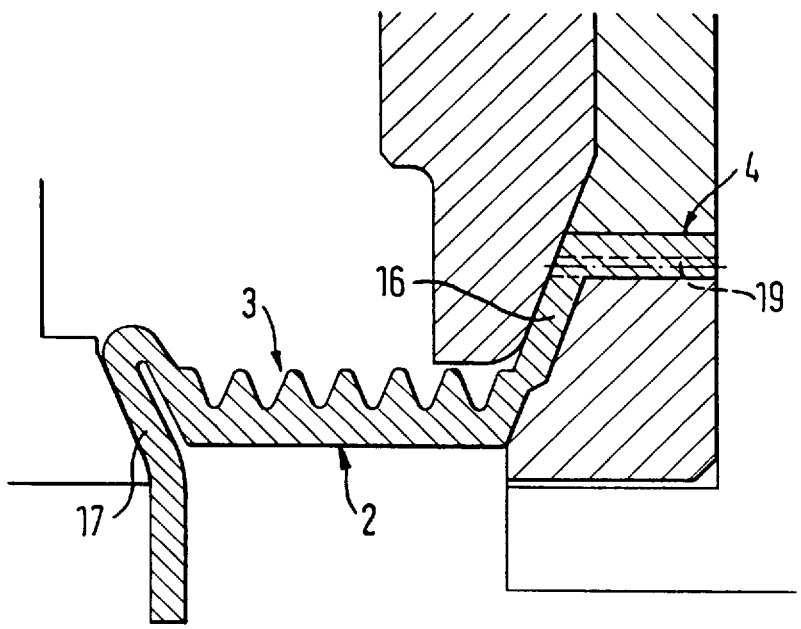
FIG. 6 shows a poly-V-pulley with reference mark sensor toothing and radially infed spinning roll and a spinning mandrel.

FIG. 6 shows the construction of a toothing 19 on the reference mark sensor 4, which was previously formed or shaped by flattening the thickened terminal area 30 of the outer flange 16.

I claim:

1. A method for the manufacture of a poly-V-pulley with an integrated, toothed reference mark sensor by spinning, comprising: performing a radial spinning to form a cup-shaped preform which has a cylindrical area and a radial hub region with at least one asymmetrical thickening region joining said cylindrical area with said radial hub region, said asymmetrical thickening region having a thickness greater than a thickness in said cylindrical area and a thickness in said radial hub region; reducing a diameter of the cyclindrical area and said asymmetrical thickening region, accompanied by a simultaneous formation of an outer flange, and following a profiling of the cylindrical area, performing a toothing process for a reference mark sensor formed on the outer flange.

2. Method according to claim 1, wherein the cup-shaped preform is formed from a tilted circular metal blank.

3. Method according to claim 2, wherein the tilted circular metal blank is prefabricated by pressing and after fixing in a spinning machine is formed to a cup-shaped preform.

4. Method according to claim 2, wherein the tilted circular metal blank is formed in a spinning machine from a circular metal blank.

5. Method according to claim 1, wherein the cup-shaped preform with the asymmetrically thickened cylindrical area is formed or shaped from an upset circular metal blank with an upset blank edge and a thickened terminal area.

6. Method according to claim 1, wherein following the diameter reduction, firstly a preprofiling takes place of the thickened cylindrical area and simultaneously an inner flange is preshaped.

7. Method according to claim 6, wherein after preprofiling a final profiling takes place, accompanied by a final shaping of the inner flange.

8. A method according to claim 1, wherein said asymmetrical thickening region includes a portion adjoining the radial hub region which extends away from the cylindrical area in the axial direction.

9. A method according to claim 8, wherein said radial spinning is accomplished by a spinning roll having a contour including a first section which extends in the axial direction, a second section which includes a curved depression and a third section which projects in the radial direction.

10. A method according to claims 9, wherein the preform is held by a chuck having a beveled area extending axially away from said radial hub region.

11. An apparatus for the manufacture of a poly-V-pulley with an integrated, toothed reference mark sensor with a spinning machine, which has chuck halves and successively radially infeedable spinning and upsetting rolls, for performing the method according to claim 1, wherein the radially infeedable spinning and upsetting rolls are asymmetrically constructed and have a projection and a depression or a concave recess.

12. Apparatus according to claim 11, wherein the spinning roll used for forming the tilted circular metal blank in the cup-shaped preform is provided with the projection, the depression and a horizontal area and the projection cooperates with the chuck half, which is provided with a bevelled area for forming the inner flange.

13. Apparatus according to claim 11, wherein the spinning roll used for diameter reduction and simultaneous formation of the outer flange with terminal reference mark sensor region has an inner flange-side projection and an outer flange-side projection, which bound the concave recess, and to the outer flange-side projection is connected a depression for forming the outer flange.

* * * * *